United States Patent
Dent et al.

(10) Patent No.: US 6,625,236 B1
(45) Date of Patent: Sep. 23, 2003

(54) METHODS AND SYSTEMS FOR DECODING SYMBOLS BY COMBINING MATCHED-FILTERED SAMPLES WITH HARD SYMBOL DECISIONS

(75) Inventors: Paul W. Dent, Pittsboro, NC (US); Kambiz Zangi, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/500,314

(22) Filed: Feb. 8, 2000

(51) Int. Cl.[7] .......................... H04L 27/06; H03M 13/03
(52) U.S. Cl. ........................................ 375/341; 714/794
(58) Field of Search ..................... 375/341, 316, 375/346, 350; 714/794, 795

(56) References Cited

U.S. PATENT DOCUMENTS

| | | | |
|---|---|---|---|
| 4,947,409 A | 8/1990 | Raith et al. | 375/97 |
| 5,048,059 A | 9/1991 | Dent | 375/94 |
| 5,070,303 A | 12/1991 | Dent | 328/145 |
| 5,084,669 A | 1/1992 | Dent | 324/83 D |
| 5,093,848 A | 3/1992 | Raith | 375/97 |
| 5,099,499 A | 3/1992 | Hammar | 375/94 |
| 5,136,616 A | 8/1992 | Dent | 375/94 |
| 5,148,485 A | 9/1992 | Dent | 380/46 |
| 5,241,702 A | 8/1993 | Dent | 455/278.1 |
| 5,271,042 A | 12/1993 | Borth et al. | 375/101 |
| 5,331,666 A | 7/1994 | Dent | 375/94 |
| 5,335,250 A | 8/1994 | Dent et al. | 375/10 |
| 5,557,645 A | 9/1996 | Dent | 375/340 |
| 5,568,520 A | 10/1996 | Lindquist et al. | 375/344 |
| 5,614,904 A | 3/1997 | Dent | 341/143 |
| 5,673,291 A | 9/1997 | Dent | 375/262 |
| 5,712,637 A | 1/1998 | Lindquist et al. | 341/155 |
| 5,749,051 A | 5/1998 | Dent | 455/324 |
| 5,841,816 A | 11/1998 | Dent et al. | 375/331 |
| 5,920,599 A * | 7/1999 | Igarashi | 375/341 |
| 6,484,283 B2 * | 11/2002 | Stephen et al. | 714/786 |

FOREIGN PATENT DOCUMENTS

EP    0 682 414 A1    11/1995

OTHER PUBLICATIONS

International Search Report, PCT/US01/01430, May 25, 2001.

Anastaspoulos et al., *Adaptive Soft–Decision Algorithms for Mobile Fading Channels*, European Transactions on Telecommunications, IT, Eurel Publication, Milano, vol. 9, No. 2, Mar. 1, 1998, pp. 183–190.

U.S. patent application Ser. No. 09/237,356, Chennakeshu et al., filed Jan. 26, 1999.

U.S. patent application Ser. No. 08/938,905, Dent, filed Sep. 26, 1997.

U.S. patent application Ser. No. 08/938,410, Dent, filed Sep. 26, 1997.

* cited by examiner

*Primary Examiner*—Khai Tran
(74) *Attorney, Agent, or Firm*—Myers Bigel Sibley & Sajovec

(57) ABSTRACT

Multibit symbols from a signal that is received on a communications channel are decoded by combining a matched filtered signal that is derived from input signal samples, and hard decisions that are derived from the input signal samples, in order to obtain soft symbol values. MLSE-PSP processing may be performed on prefiltered input signal samples to obtain the hard decisions. The original, unprefiltered input signal samples also may be match filtered to determine improved soft information, to thereby allow the symbol decisions to be refined over and the above the result provided by MLSE-PSP. The soft symbol values then may be processed to obtain soft bit values for each bit of the multibit symbols. In particular, the soft symbol values may be converted to soft bit values and interleaved to provide soft, coded bit values. Error correction decoding then may be applied to the soft, coded bit values to provided the decoded bits.

41 Claims, 3 Drawing Sheets

METHODS AND SYSTEMS FOR DECODING SYMBOLS BY COMBINING MATCHED-FILTERED SAMPLES WITH HARD SYMBOL DECISIONS

BACKGROUND OF THE INVENTION

This invention relates to digital communication methods and systems and more particularly to methods and systems for decoding symbols from a signal that is received on a communications channel.

Digital communication systems and methods including digital wireless communication systems and methods are widely used to convey information. As is well known to those having skill in the art, in digital communications, information is often generated as, or translated into, a stream of bits. A transmitter then maps this bit stream into a symbol stream which is modulated and transmitted on a communications channel. A digital receiver detects the signal and maps the signal back into decoded bits.

As is also well known, equalizers are used to demodulate information symbols from information-modulated signals that are received from a transmitter through a communications channel suffering from time dispersion, giving rise to Inter-Symbol Interference (ISI). Conventional equalizers include transversal equalizers, which apply transversal or finite impulse response filters to the received signal which are the inverse of the channel characteristic, thus undoing at least some of the deleterious effect of the channel. Unfortunately, transversal equalizers may not be effective for all types of channels, and can result in magnification of noise.

Another known type of equalizer is a Decision Feedback Equalizer (DFE) wherein already decoded bits are used to subtract out their delayed echoes caused by time dispersion, thereby canceling ISI and enabling the next bit to be decoded. Unfortunately, DFE equalizers may only work well when later delayed echoes are weaker than the signal component being decoded. Otherwise, DFE may discard too much useful energy in the echoes. It is possible in such circumstances to store received signal samples and process them retrospectively in time reversed order. Equalizers that process in either a forward or reverse time order are described, for example, in U.S. Pat. Nos. 5,841,816 to coinventor Dent and Croft entitled "Diversity PI/4-DQPSK Demodulation" and U.S. Pat. No. 5,335,250 to coinventor Dent and Chennakeshu, entitled "Method and Apparatus for Bidirectional Demodulation of Digitally Modulated Signals", the disclosures of which are hereby incorporated herein by reference in their entirety. These patents also describe a Maximum Likelihood Sequence Estimation (MLSE) technique which, unlike DFE, need not discard energy in delayed echoes.

Equalizers generally may need to determine the phase and magnitude of all significant delayed echoes relative to some nominal delayed ray, which values characterize the transmission channel and therefore are called channel coefficients or channel estimates. Channel estimates may be determined by including known symbols in the transmitted signal in the form of a "syncword" or "pilot symbols". Alternatively, in the case of equalizers known as blind equalizers, the channel and the unknown data may be estimated simultaneously. One form of blind equalizer is described in U.S. Pat. No. 5,557,645 to coinventor Dent, entitled "Channel-Independent Equalizer Device" the disclosure of which is hereby incorporated herein by reference in its entirety.

When an equalizer or demodulator is to be followed by an error correction decoder, it can be advantageous for error correction decoding to pass "soft" decisions rather than "hard" decisions from the demodulator to the error correction decoder. The soft decisions should preferably be values indicative of the likelihood that a particular symbol is one or other value, and more specifically, preferably proportional to the negative logarithm of the symbol likelihood. Often, the signal-to-noise ratio of the symbol is an adequate soft decision. Such soft decisions may be obtained from MLSE equalizers by a technique described in U.S. Pat. No. 5,099,499 to Hammar, entitled "Method of Generating Quality Factors for Binary Digits Obtained in the Viterbi-Analysis of a Signal" the disclosure of which is hereby incorporated herein by reference in its entirety. Hammar equates a soft decision for a binary symbol to a difference between a metric for the opposite value of the symbol minus the metric for the decoded value of the symbol, divided by the sum of all metrics, or final metric, of the MLSE equalizer. The difference metrics are indicative of the symbol's signal strength while the final metric is indicative of the noise in the channel. Thus Hammar's soft information can be a measure of signal-to-noise ratio on a per-symbol basis.

U.S. Pat. No. 5,331,666 to coinventor Dent, entitled "Adaptive Maximum Likelihood Demodulator" the disclosure of which is hereby incorporated herein by reference in its entirety, describes an MLSE device for four-phase modulations such as QPSK, OQPSK, DQPSK and $\pi/4$-DQPSK. It describes how metric computations may be simplified by exploiting quadrantal symmetry in a 4-phase constellation.

In co-pending application Ser. No. 09/499,977, filed Feb. 8, 2000, entitled Methods, Receivers And Equalizers For 8PSK Modulation Having Increased Computational Efficiency to coinventor Zangi, an 8-PSK equalizer is described that exploits octant-symmetries in the constellation to reduce metric calculations. This application is hereby incorporated by reference herein in its entirety.

Unfortunately, the above-described equalization techniques may become computationally intensive when the number of symbols and/or the amount of intersymbol interference becomes large. The computational complexity may result in increased power consumption in a mobile terminal and/or increased processing time. Moreover, the symbol decisions that are made in an equalizer may not provide a desired input for an error correction decoder. Thus, in order to increase the probability that individual symbols are decoded with high probability, further complexity may be introduced.

In particular, for various reasons, symbol decisions made in an equalizer may not provide a desired input for an error correction decoder. An MLSE equalizer determines a sequence which, with highest probability, is the sequence that was transmitted. However, an individual symbol may not be the symbol which, with highest probability, was the symbol transmitted. To obtain the probability of individual symbols, a different type of demodulation known as Maximum A-Posteriori (MAP) decoding may be used, which however can be of excessive complexity. A difference between MAP and MLSE derives from the tendency of error events in an MLSE device to be multiple error events, in which a group of adjacent symbols may be erroneous or of high error probability.

Moreover, full MLSE often is too complex and a combination of MLSE and DFE may be used, known as Per-Survivor Processing (PSP). MLSE-PSP may be useful when the time dispersion spans a large number L of symbol periods, the symbols are from a larger than binary alphabet of M symbols, and the resulting full MLSE complexity, which is proportional to $M^L$ may be too large. For example, for 8-PSK (M=8) and five symbol periods of time dispersion, an MLSE device may need to compute $8^5$=32, 768 metrics per decoded symbol, which generally is excessive.

In U.S. application Ser. No. 09/237,356 filed Jan. 26, 1999 entitled "Reduced Complexity MLSE Equalizer for M-ARY Modulated Signals" to coinventor Zangi, the disclosure of which is hereby incorporated herein by reference in its entirety, it is shown that this number may be reduced by exploiting octant symmetries in 8-PSK. However, even reducing metric computations four or eightfold may not be enough. As a result, less than full MLSE may need to be used.

In reduced MLSE, not all combinations of five successive symbols (for 5-symbol time dispersion) are computed. The oldest (for example three) symbols are instead "decided" and their values used in a DFE operation to subtract out the ISI caused by the already decided symbols, leaving only, for example, two symbols to be hypothesized in the MLSE part of the device. This can reduce the number of metric computations to 64. Because different sets of the decided symbols are kept in a path history for each of the possibilities or states of the MLSE device, which number $M^{L-1}$, where L is the number of symbols estimated by MLSE, the DFE taps are "per state" DFE taps and not the same for all states. Hence the term "per survivor processing" is used.

Unfortunately, just as in pure DFE, MLSE-PSP may not operate well when the energy in delayed echoes corresponding to the DFE or PSP taps is greater than the energy in the MLSE taps. However, the distribution of echo energy between different symbol-spaced delays can be altered by filtering the received data to either cancel some echoes or add other echoes or both. Thus MLSE-PSP can be performed by first estimating the strengths of delayed echoes, then deciding if the energy distribution is favorable for MLSE-PSP or time-reversed MLSE-PSP. If not, for example there being more strong echoes than MLSE taps, a pre-filter is determined using, for example, the method described in the above-cited Zangi application, to change the energy distribution to be most favorable to MLSE-PSP. There may, however, be a reduction in performance from full MLSE, resulting in more errors and imperfect soft information, as a consequence of the pre-filtering operation, which does not represent a matched filter for the signal.

Accordingly, notwithstanding the above-described techniques, there continues to be a need for methods and systems for decoding multibit symbols that can accurately decode individual symbols with high accuracy, without the need to introduce undue processing complexity into the decoding methods and systems.

SUMMARY OF THE INVENTION

Multibit symbols from a signal that is received on a communications channel are decoded by combining a matched filtered signal that is derived from input signal samples, and hard decisions that are derived from the input signal samples, in order to obtain soft symbol values. The soft symbol values then may be processed to obtain soft bit values for each bit of the multibit symbols. In particular, the soft symbol values may then be converted to soft bit values and interleaved to provide soft, coded bit values. Error correction decoding then may be applied to the soft, coded bit values to provide the decoded bits.

More specifically, at least one sample for each symbol is obtained from the signal that is received from the communications channel. The at least one sample for each symbol is processed to obtain hard symbol decisions for the symbols. The at least one sample for each symbol also is matched filtered to obtain a block of matched filtered samples comprising one sample per symbol. The block of matched filtered samples and the hard symbol decisions then are combined to obtain soft symbol values. The soft symbol values then are processed to obtain soft bit values for the multibit symbols.

MLSE-PSP processing may be performed on prefiltered input signal samples to obtain hard decisions. The original, unprefiltered input signal samples also may be processed to determine improved soft information without the influence of the prefilter to thereby allow the symbol decisions to be refined over and above the result provided by MLSE-PSP.

In a preferred embodiment, the at least one sample for each symbol is one sample for each symbol, and the at least one sample for each symbol is processed by performing Viterbi MLSE and PSP. The at least one sample preferably is prefiltered to thereby condition the at least one sample for the MLSE-PSP processing. The prefilter coefficients may be computed based upon channel coefficients for the communications channel. Channel coefficients may be computed based upon known symbols for the communications channel. The matched filter may include the effect of the receiver intermediate frequency filter.

In combining the block of matched filtered samples and the hard symbol decisions to obtain soft symbol values, the hard symbol decisions may be passed through a composite filter that represents transmit filtering, a multipath propagation channel and the matched filtering. The composite filtering may be based on channel estimates made with the aid of known symbols. The composite filtering also may be based on the hard symbol decisions. The combining may produce one intersymbol interference-free complex number per symbol to provide equalized soft symbol values.

According to another aspect of the present invention, when processing the soft values to obtain soft bit values for each bit of the multibit symbols, the symbols may be rotated through 22.5 degrees such that possible symbol values lie at odd multiples of 22.5 degrees in the complex plane. A soft value for a first bit may be derived only from the real part of the soft symbol values, and a soft value for a second bit may be derived only from the imaginary part of the soft symbol values. The soft value for a third bit per symbol may be derived from the real and imaginary parts of the soft symbol combined with the hard decisions for a first and a second bit. Improved decoding of multibit symbols from a signal that is received on a communications channel thereby may be obtained.

DETAILED DESCRIPTION OF THE DRAWINGS

Figure 1:
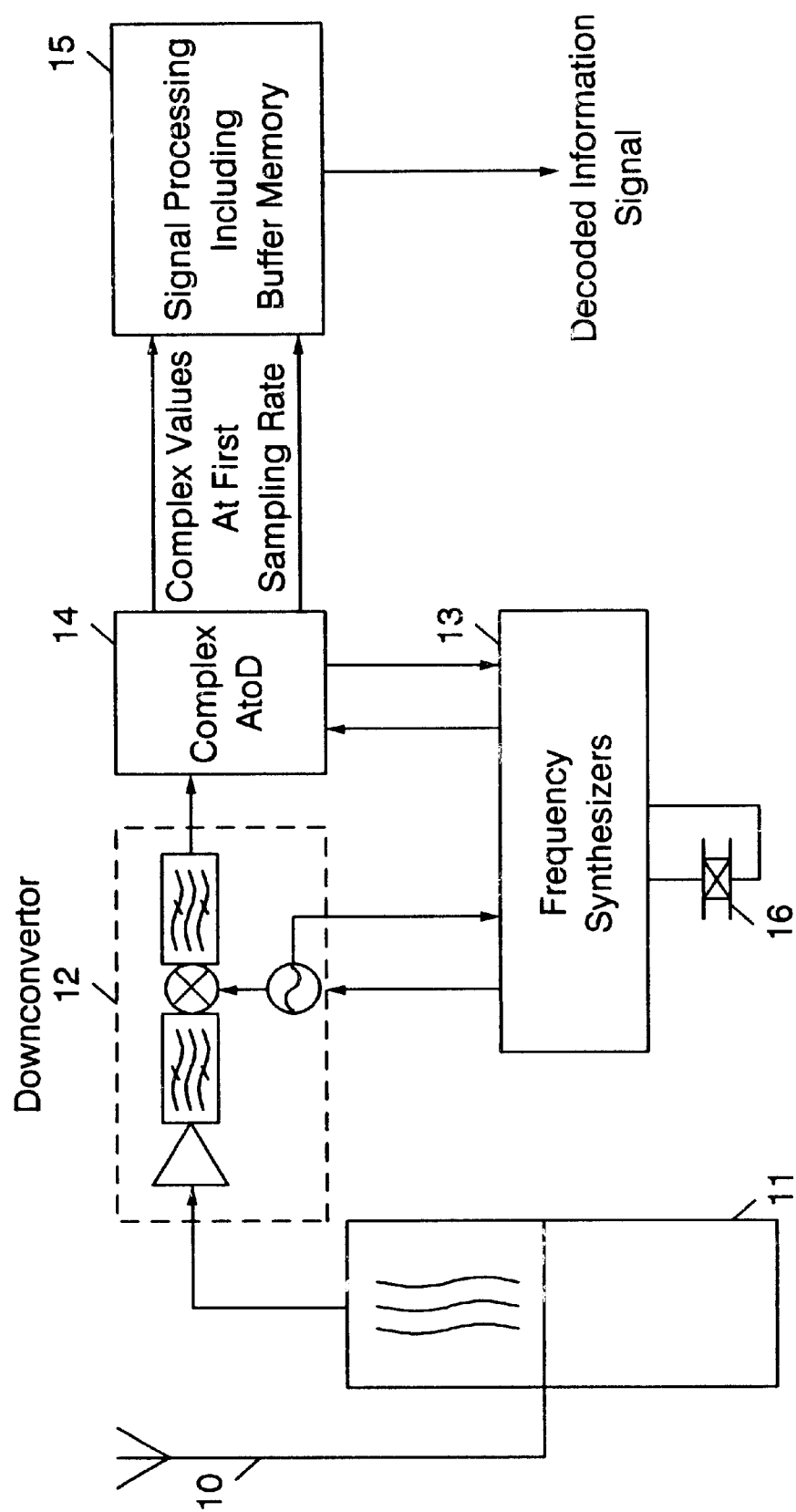
FIG. 1 is a block diagram of receiving systems and methods according to the present invention.

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, systems (apparatus), and/or computer program products. Accordingly, the present invention may take the form of an entirely hardware embodiment, an entirely software embodiment or an embodiment combining software and hardware aspects.

Various aspects of the present invention are illustrated in detail in the following Figures, including block diagram and flowchart illustrations. It will be understood that each block, and combinations of blocks, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the flowchart block or blocks.

Accordingly, blocks of the Figures support combinations of means for performing the specified functions, combinations of steps for performing the specified functions and program instructions for performing the specified functions. It will also be understood that each block of the illustrations, and combinations of blocks in the illustrations, can be implemented by special purpose hardware-based computer systems which perform the specified functions or steps, and/or by combinations of special purpose hardware and computer instructions.

The present invention receives an information-modulated signal from a transmitter over a dispersive medium. The dispersive medium "smears" successive symbols into each other creating Inter-Symbol Interference (ISI). Due to ISI, each received signal sample depends on a plurality L of transmitted symbols selected from an alphabet of M symbols. A full Maximum Likelihood Sequence estimator (MLSE) for such a signal generally comprises testing all $M^L$ symbol combinations to decode each signal sample using the Viterbi algorithm. This may be too complex when M or L is large.

According to the invention, an equalizer technique described in the above cited application Ser. No. 09/499,977 to coinventor Zangi, may be applied first, to obtain hard symbol decisions for the symbols. In particular, channel estimation is performed to determine a set of channel coefficients that describe the dependence of each signal sample on each of L symbols. Prefilter computation is then performed using the channel estimates to determine a prefiltering that will change the dependence on the L symbols to a dependence suitable for an MLSE equalizer with Per-Survivor Processing MLSE decision feedback taps. Prefiltering then is performed using the determined prefilter. Then, MLSE-PSP equalizing is performed to determine an estimate of the transmitted symbols.

According to the invention, these symbol estimates may be used to subtract ISI from the original, un-prefiltered signal samples using the original channel estimates in order to obtain, for each symbol, L modified signal samples that can depend only on that one symbol, the influence of surrounding symbols having been subtracted out. Then, the L symbols are combined, for example, using the time-reversed conjugate channel estimates as optimum combining coefficients to obtain a single complex number representative of each symbol.

In one embodiment of the invention, the complex number denoted by Z is converted to soft information for each of the $Log_2$ (m) information bits of the symbol. An exemplary technique for 8-PSK modulation comprises rotating the complex number Z through 22.5 degrees to obtain a new real part I and a new imaginary part Q, forming a soft value B1' for bit B1 dependent only on the imaginary part Q, forming a soft value B1' for bit B1 dependent only on the real part I, and forming a soft value for B3 dependent on both the real and imaginary parts. The three soft-bit values described above also may be scaled using an estimate of the total signal-to-noise ratio obtained from the sum of the squares of the channel coefficients divided by the best, final MLSE-PSP metric. The combined soft-bit values then may be processed by an error correction decoder in a conventional manner to correct errors.

In a second embodiment of the invention, after obtaining first hard decisions for symbols using, for example, an MLSE-PSP equalizer, the above back-substitution procedure may be used to compute a single complex number for each symbol. This single complex number is then quantized to the nearest symbol in the alphabet to obtain a new hard decision, that may differ in some symbol positions from the original MLSE-PSP hard decisions due to the effect of the prefiltering operation. since the new decision is based on signal samples before prefiltering, a better decision can be made that need not suffer from the prefiltering loss. The improved hard decisions can be used after a single back-substitution pass, or else re-substituted and iterated any desired number of times, until, for example, no further changes are noted in the hard decisions. The improved hard decisions then are converted to soft decisions as already described above.

Each received sample (before prefiltering) can be described by the equation:

$$r(k)=Co \cdot S(k)+C1 \cdot S(k-1)+C2 \cdot S(k-2) \ldots +C_{(L-1)} \cdot S_{(k-L+1)}.$$

Thus, if first estimates of all symbols are provided by a first equalizing process such as MLSE-PSP, then the influence of symbols S(k−1) to S(k−L+1) may be subtracted by forming $$r'(k)=r(k)-C1 \cdot S(k-1)-C2 \cdot S(k-2)- \ldots -C_{(L-1)} \cdot S_{(k-L+1)},$$

which is now a measure of the remaining term, Co·S(k).

In order to perform the above subtraction, it is desirable to have estimates of the channel coefficients Co, C1 . . . $C_{(L-1)}$, which may be formed by correlating the received signal with a set of known symbols included periodically in each transmitted signal segment (such as a TDMA burst or slot). Channel estimates are preferably made by solving an overdimensioned set of simultaneous equations relating channel coefficients and known symbol values to received signal samples, as described in the above-cited U.S. Pat. No. 5,557,645.

Other received signal samples that depend on the symbol S(k) are $$r(k+1)=Co \cdot S(k+1)+C1 \cdot S(k)+C2 \cdot S(k-1).$$

$$r(k+2)=Co \cdot S(k+2)+C1 \cdot S(k+1)+C2 \cdot S(k).$$

and so on. By subtracting the influence of all symbols except S(k), modified received signal samples r'(k), r'(k+1) . . . r'(k+L−1) may be obtained which can depend only on S(k) via an associated channel coefficient. These values can be optimally combined, according to the theory of optimum diversity combination, by weighting each with the conjugate of the associated channel coefficient and adding, thus obtaining a complex number Z given by:

$$Z=Co^* \cdot r'(k)+C1^* \cdot r'(k+1) \ldots +C^*_{(L-1)} \cdot r'(k+L-1).$$

which is now a measure of $$(Co^2+C1^2 \ldots +C^2_{(L-1)}) \cdot S(k),$$

that is, a measure of the symbol S(k) weighted with its total energy in all echoes.

In corresponding U.S. application Ser. No. 09/500,366, filed Feb. 8, 2000, entitled "8-PSK Transmit Filtering Using Reduced Look-Up Tables" to coinventor Dent, the disclosure of which is hereby incorporated by reference herein, it is shown that an 8-PSK constellation may be rotated through +22.5° to give symbol values that have real (I) and imaginary (Q) parts, each only dependent on two out of the three bits of each 8-PSK symbol according to the formulae:

$$I=aB2-bB2 \cdot B3 \text{ where } a=0.5(\sin(67.5°)+\sin(22.5°))$$

$$Q=aB1+bB1 \cdot B3 \text{ and } b=0.5(\sin(67.5°)-\sin(22.5°))$$

In this application, the 22.5 degree rotated constellation is used for receiver decoding. The above formulae describe the I,Q values of a rotated 8-PSK symbol of energy 1, and therefore can equate to the value of Z above, apart from the rotation and the energy scaling. The energy scaling generally corresponds to the value that it is desired to obtain for soft information, but divided into separate soft values for each of the three bits B1, B2 and B3.

Thus, Z is first rotated by 22.5° by multiplying by $e^{j\pi/16}$ to obtain rotated real and imaginary parts (I,Q). As a result of the 22.5° rotation, only noise on the I-component can now affect bit B2, and only noise on the Q-component can affect bit B1.

The soft information for a particular bit needed for an error correction decoder is the logarithm of the ratio of the probability that the particular bit is equal to Boolean 1, which may be found by summing the error exponential over all four symbols in which the bit is 1, to the probability that it is a Boolean 0, which may be obtained by summing over all four symbols in which the bit is a zero. However, since only one other bit, B3 appears in the equations relating I or Q to B2 or B1 respectively, the summation range reduces to the two values of B3 (−1 and +1) as follows. The log-likelihood ratio for B1 is a function of the imaginary part Q only, and is given by:

$$B1' = \log_e \left[ \frac{\sum_{B3=-1}^{B3=1} e^{\frac{-(Q-S(a+bB3))^2}{2\sigma_q^2}}}{\sum_{B3=-1}^{B3=1} e^{\frac{-(Q+S(a+bB3))^2}{2\sigma_q^2}}} \right],$$

where $\sigma_q$ is the rms noise on the Q-part, and $S^2=\Sigma|C_k|^2$ is the total received signal power. Likewise, the log-likelihood ratio for bit B2 is a function of the real part I only, and is given by:

$$B2' = \log_e \left[ \frac{\sum_{B3=-1}^{B3=1} e^{\frac{-(I-S(a-bB3))^2}{2\sigma_i^2}}}{\sum_{B3=-1}^{B3=1} e^{\frac{-(I+S(a-bB3))^2}{2\sigma_i^2}}} \right],$$

where $\sigma_i$ is the rms I-part noise.

If the above exact formulae are to be evaluated, it will be noted that these formulae compute the log of the sum of numerator terms, the logarithm of which is given (it is the power in the exponentiation), and likewise for the denominator terms. This is the problem of logarithmic addition addressed in U.S. patent application Ser. No. 08/938,905, entitled "Efficient Method for Averaging Logarithmic Signal Strength Values" and Ser. No. 08/938,410, entitled "Method of Averaging Logarithmic Values" both to coinventor Dent, both filed Sep. 26, 1997, the disclosures of which are hereby incorporated herein by reference. The techniques described therein may be advantageously applied to compute the exact soft information expressions.

It is known, however, to approximate the soft information by including in the above summation only the term for which P(B3) is the largest, i.e. to use the hard decision for B3. When this is done, the above expressions simplify drastically to:

$$B1'=(a+bB3)Q[2S/\sigma_q^2] \text{ and}$$

$$B2'=(a-B3)I[2S/\sigma_i^2].$$

Similarly, the full expression for soft information for B3 is:

$$B3' = \log_e \left[ \frac{\sum_{B1,B2} e^{-\left[\frac{(I-S(a-b)B2)^2}{2\sigma_i^2} + \frac{(Q-S(a+b)B1)^2}{2\sigma_q^2}\right]}}{\sum_{B1,B2} e^{-\left[\frac{(I-S(a+b)B2)^2}{2\sigma_i^2} + \frac{(Q-S(a-b)B1)^2}{2\sigma_q^2}\right]}} \right].$$

When only the most probable values for B1 and B2 are used in the above $\Sigma$'s, i.e., the hard-decisions for B1 and B2 are substituted, and for the conventional case of equal noise on the I and Q values, the above expression simplifies drastically to:

$$B3'=b(B1 \cdot Q-B2 \cdot I) \cdot (2S/\sigma^2)$$

Thus, by carrying out a first demodulation using a non-optimum MLSE-PSP equalizer involving prefiltering to shorten the channel impulse response, then using the symbol decisions so-obtained in a second demodulation involving an optimum matched filter, including subtraction of ISI to obtain one complex number per symbol, which is then converted to soft information in the above manner, an improved soft-decoded result may be obtained. Optionally, the improved soft decisions may be converted to improved hard decisions by taking the sign for each bit. The improved hard-decisions, if different from the original, may be iteratively back-substituted until convergence is achieved.

The following procedure may be used for subtraction of ISI, given hard decisions. First, the fact that the signal may already have been filtered by the receiver Intermediate Frequency filter, and therefore that part of the matched filtering may already have been done, may be ignored. Expressed in a different way, the matched filtering described by the equations below represents the total filtering, including IF filtering.

Let coefficients Ck, k=1,L describe the channel formed by transmit filtering and multiple propagation paths of length L symbols, and let r(i) be received complex samples. Then compute matched-filtered samples using:

$$Zi = \sum_{k=1}^{k=L} C_k^* r_{i+k},$$

which is a time-reversed conjugate channel filter.

The decided symbols are now to be filtered both by the channel and the matched filter, the combined impulse response of which ranges from −L−1) to +(L−1) symbols with coefficients given by:

$$C'_j = \sum_{k=1}^{k=L} C_k^* C_{j+k},$$

where the summation ranges only over terms for which j+k is within the range 1 to L. The decided symbols then are filtered to produce values Ui given by:

$$Ui = \sum_{j=-(L-1)}^{j=+(L-1)} C'_j S_{i-j}$$

Subtracting Ui from Zi removes ISI but also the contribution $C'_o Si$ of the desired symbol. Therefore this is added back to give the desired soft symbol value as $(I,Q)_i = Zi - Ui + C'_o Si$ which then is converted to soft bit values as described earlier. $C'_o = S^2$, the total signal power as defined earlier.

Also, $e_i = Z_i - U_i$ may be identified as the error between signal sample i and the predicted value using the decided symbols. The mean square value of the real parts of the $e_i$ also yields the variance of the I values and the mean square of the imaginary parts yields the variance of the Q values as needed to compute the correctly scaled soft values B2' and B1' using the above formulae. The simplified formula for B3' can use the mean of these variances, as it assumes equal I and Q noise.

Accordingly, the second-pass decoding, which uses hard symbol decisions from the first pass, simplified MLSE-PSP equalizer to compute soft bit decisions, can include the step of matched filtering the received signal with a time-reversed conjugate channel. New channel coefficients $C_j'$ are formed by convolving the original channel coefficients with the matched filter coefficients. The $C_j'$ are convolved with the hard symbol decisions to form signal predictions. The signal predictions are subtracted from the matched filtered signal samples to obtain I and Q prediction error values. The variances of the I and Q prediction error values are computed. Soft information for the three bits of each symbol Si is computed based on the hard decisions B1, B2 and B3 for the symbol, the total signal power $C_o'$, the prediction error $e_i$ associated with symbol Si and the variances of the prediction error.

Whether the simplified formulae given above are used, or the exact formulae, some approximation using less than all the terms in the exact formulae is a matter of choice that can be made by a person skilled in the art based on the above teachings, which variations are all however considered within the spirit and scope of this invention, as described by the claims.

In practice, the received signal generally is observed through a bandpass receiver filter, the IF filter, in order to eliminate out-of-band inteferers and to limit the noise bandwidth. The IF filter generally suppresses all signals outside the Nyquist bandwidth for the sampling rate used. It is possible to oversample the signal, for example at twice the symbol rate, and then to use a wider IF filter which can have substantially no effect on the received signal's frequency components. Then the only elements of the channel that affect the signal may be the transmit filter (pulse shaping) and the propagation path. A filter matched to these may be applied digitally at the elevated input sampling rate, while the output samples are computed at the symbol rate. An embodiment of this type of receiver is illustrated by the block diagram of FIG. 1.

Referring now to FIG. 1, signals are received at an antenna 10 and passed through a duplexer or transmit/receive switch 11 to a downconverter 12. The downconverter 12 filters the signal to limit the noise bandwidth to be less than the Nyquist bandwidth for the sampling rate of an A to D converter 14.

The downconverter 12 and the A to D converter 14 may be of the homodyne type, or preferably an improved homodyne receiver as described in U.S. Pat. Nos. 5,712,637 to Lindquist et al entitled "Slope, Drift and Offset Compensation in Zero—If Receivers"; U.S. Pat. No. 5,749,051 to coinventor Dent entitled "Compensation for Second Order Intermodulation in a Homodyne Receiver"; U.S. Pat. No. 5,614,904 to coinventor Dent entitled "Balance Companded Delta Conversion for Homodyne Receiver"; U.S. Pat. No. 5,568,520 to Lindquist et al. entitled "Slope Drift and Offset Compensation in Zero—If Receivers"; and U.S. Pat. No. 5,241,702 to coinventor Dent entitled "D.C. Offset Compensation in a Radio Receiver". The disclosures of all of these patents are hereby incorporated by reference herein in their entirety.

Alternatively, the downconvertor 12 and A to D converter 14 may form a logpolar receiver as described in U.S. Pat. No. 5,048,059 to coinventor Dent entitled "Log-Polar Signal Processing," with any of U.S. Pat. Nos. 5,084,669 to coinventor Dent entitled "Direct Phase Digitization", U.S. Pat. No. 5,148,485 to coinventor Dent entitled "Encrypton (sic) System for Digital Cellular Communications" and/or U.S. Pat. No. 5,070,303 to coinventor Dent entitled "Logarithmic Amplifier/Detector Delay Compensation", the disclosures of all of which are hereby incorporated by reference herein.

The A to D converter 14 digitizes the filtered, received signal while preserving instantaneous amplitude and phase information, outputting complex valued samples at a first sampling rate in either polar, logpolar or Cartesian format to a digital signal processor 15. Frequency synthesizers 13 generate clocks and local oscillators for downconversion or sampling using an accurate crystal 16 as a reference. The crystal frequency also may be fine-tuned by means of an Automatic Frequency Correction (AFC) loop which may use frequency error information from the receiver to correct the crystal frequency, as described for example in U.S. Pat. No. 5,136,616 to coinventor Dent entitled "Method of Rapidly Controlling the Frequency of a Coherent Radio Receiver and Apparatus for Carrying out the Method"; and/or U.S. Pat. Nos. 4,947,409 to Raith et al. entitled "Apparatus for Correcting Frequency in a Coherent Receiver" and/or U.S. Pat. No. 5,093,848 to Raith et al., entitled "Method of Controlling the Frequency of a Coherent Radio Receiver and Apparatus for Carrying out the Method," the disclosures of all of which are hereby incorporated by reference herein.

Digital signal processing unit 15 preferably contains a buffer memory for receiving digitized signal information, so that the information held in the buffer memory does not need to be processed symbol-by-symbol in real time, but may be processed "off-line" after receiving a large enough block of signal samples, such as a TDMA slot or burst, which contains unknown information symbols to be decoded as well as known symbols to assist in channel estimation. Using buffering, it also is possible to process received signal samples in either natural time order, time-reversed order or a mixture, or to process the samples a multiplicity of times in the same or different ways, as described in U.S. Pat. Nos. 5,841,816 to coinventor Dent et al. entitled "Diversity PI/4-DQPSK Demodulation"; U.S. Pat. No. 5,673,291 to coinventor Dent entitled "Simultaneous Demodulation and Decoding of a Digitally Modulated Radio Signal Using Known Symbols"; and/or U.S. Pat. No. 5,335,250 to coinventor Dent et al. entitled "Method and Apparatus for Bidirectionally Demodulation of Digitally Modulated Signals", the disclosures of which are hereby incorporated herein by reference.

Figure 2:
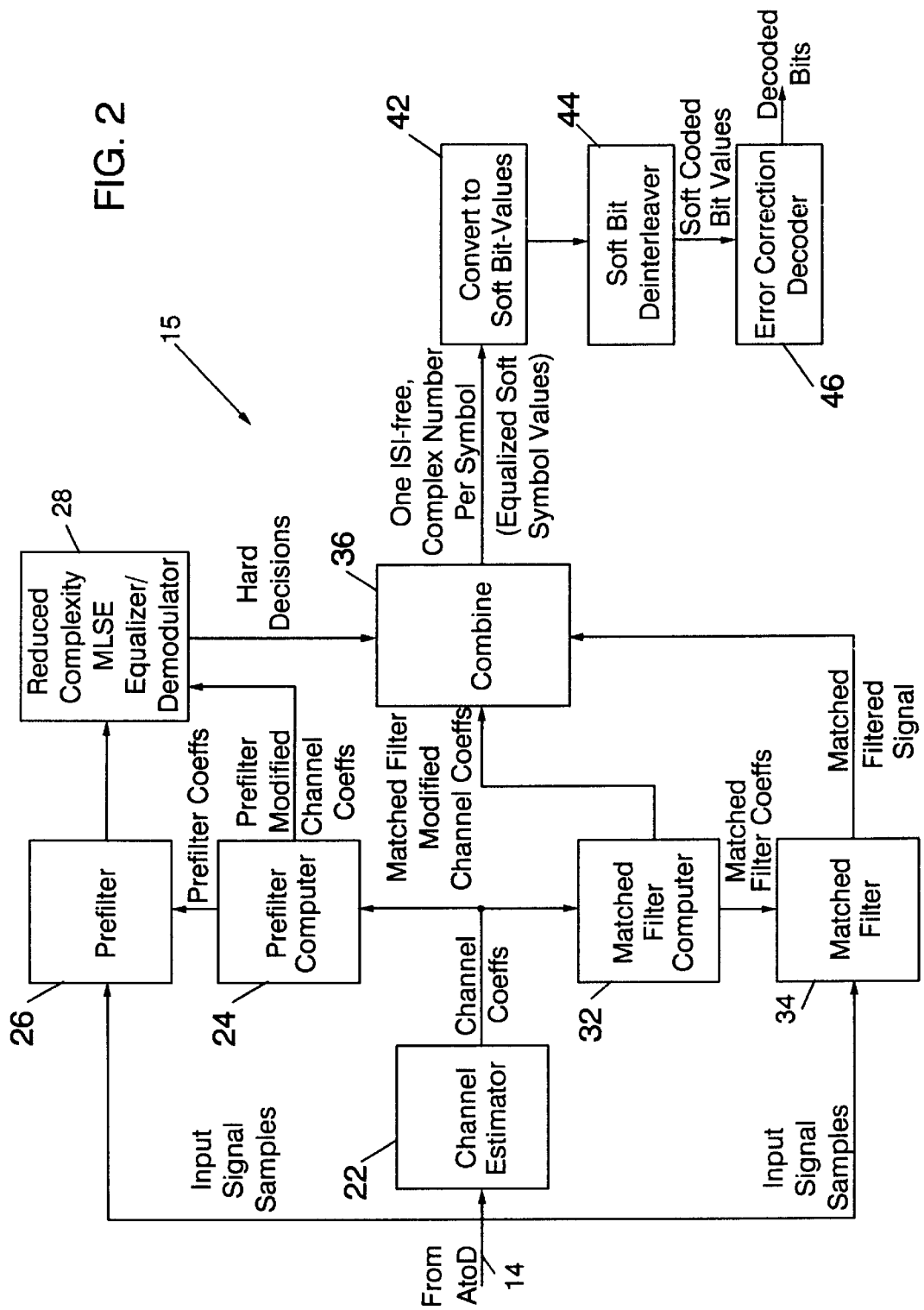
FIG. 2 is a block diagram of signal processing for decoding symbols according to the present invention.

FIG. 2 is a block diagram of an embodiment of decoding methods and systems that can be performed by the signal processor 15 of FIG. 1, according to the present invention. As was already described, each block of FIG. 2 and combination of blocks of FIG. 2 may be embodied as hardware, software and/or combinations thereof.

Referring now to FIG. 2, input signal samples, for example from A to D converter 14 of FIG. 1, are processed in a first way to obtain hard decision estimates of the information symbols contained in a signal sample block. The first processing uses, for example, a channel estimator 22 that uses correlation with known symbols to determine a number of multipath or channel coefficients, and a prefilter computer 24 that computes coefficients of a prefilter 26 from the channel coefficients, application of which to the received signal samples will condition the signal samples to be better decodable using a Maximum Likelihood Sequence Estimator 28 having a limited number of Viterbi states, as described by the above-cited application to coinventor Zangi. The received input signal samples are filtered using the prefilter 26, and MLSE 28 decoding of the filtered samples is used to produce hard symbol decisions. Other techniques of obtaining an initial set of hard symbol decisions alternatively may be used.

The present invention then uses the hard symbol decisions to process the original received signal samples again in order to obtain soft decisions representative of the log-likelihood ratio for the constituent binary bits of each symbol. As described above, this second processing can use a matched filter computer 32 that uses channel estimates from the channel estimator 22. A matched filter 34 filters the received signal samples. The hard decisions are then combined in a combiner 36, using both the channel filter and the matched filter. In particular, the matched filtered signal samples may be compared with the filtered symbols to obtain a mismatch or error value for each symbol and the mean square variance of the real part of the errors and the imaginary part of the errors may be computed. The hard decisions for each symbol then may be combined with a corresponding error value to obtain an ISI-free complex number per symbol. This complex number is converted to soft bit values in a converter 42. The soft bit values from several block-demodulations of the above type may then be deinterleaved in a deinterleaver 48 prior to being error-correction decoded in an error correction decoder 46.

One performance limitation of decoding as described above may be inaccuracies of the channel estimates. Once first hard decisions for the data symbols are available however, another embodiment of processing the signal can include using these to perform channel estimation a second time. Thus, improved channel estimates may be obtained by correlation of the received signal samples or matched-filtered signal samples with the decided symbols.

The channel estimates for the soft-information processing pass are used to determine the matched filter coefficients. The matched filter preferably is matched to the transmit pulse shape combined with the multipath propagation channel characteristics.

When the receiver IF filtering prior to A to D converter 14 is narrow, and already matched to the transmit pulse shape/spectrum, channel estimation of the receiver filter output by correlating with known symbols can yield coefficients that combine the transmit pulse shape, the propagation channel and the receive filter. Moreover, since the receive filter already matches the transmit pulse shape, only that part of the matched filter which matches the propagation channel may be left to apply. Therefore, it may be desired to estimate only the propagation channel prior to the receive filter by observing symbols that have passed through the transmit and receive filters. This may be accomplished in a manner which now will be described.

Assume that the receive filter is matched to the transmit pulse shape. Any deviations from this assumption can be lumped in with the propagation channel. The combination of the transmit and receive filter assumed therefore is known, and can be applied to the symbols to obtain one filtered sample per symbol as a complex sequence v(i). It is desired to find propagation channel coefficients $C(k)$, $k=-L$ to $+L$ such that:

$$C(-L)v(i+L)+C(-L+1)v(i+L-1) \ldots +Co.v(i)+C(1)v(i+1) \ldots + C(L)v(i-L)=r(i)$$

for all "i". This is a set of overdimensioned simultaneous equations for vector $C=C(-L)$ to $C(+L)$ with coefficient matrix V comprised of the v-values. Its solution is $$C=(V^{\#}V)^{-1}V^{\#}R,$$

where R is a vector of the r(i) values.

The propagation channel C estimated above may be time-reverse-conjugated and applied to the received signal samples r(i) to yield matched filtered samples Z(i). Other techniques of estimating the remaining, propagation-channel representative part of the matched filtering left to be applied after the receive filter alternatively may be used.

Now, the whole filtering comprised of transmit pulse shaping, multipath propagation channel and receiver matched filtering may be applied to the decided symbols to obtain corresponding Ui values to subtract from the Zi values, leaving error values $e_i$.

This entire filtering can be re-estimated by using the decided symbols $S_i$ in yet another estimation process to obtain new coefficients given by:

$$(S^{\#}S)^{-1}S^{\#}Z$$

where S is now a matrix composed of shifts of the symbol sequence Si, and Z is a vector of the $z_i$ values. The shifts of the symbols Si may be bordered at each end of the Si sequence with either tail bits, which are commonly transmitted to allow for end-effects, and which are identified in the specification for the digital cellular telephone system known as GSM, or may be zero-valued symbols used for transmit up- and down-ramping. These tail bits or ramping symbols may be used to fill in the corners of the S-matrix.

The above coefficients, when applied to the decided symbols Si, thus result in values Ui given by:

$$U=S(S^\#S)^{-1}S^\#Z.$$

Then, the values $e_i$ arranged as a vector E are given by:

$$E=Z-U=(I-S(S^\#S)^{-1}S^\#)Z.$$

This expression therefore is a closed form for the e-values given matched-filtered receive samples Zi and a set of hard symbol decisions Si. The e-values then may be processed as described above to determine soft bit values.

Figure 3:
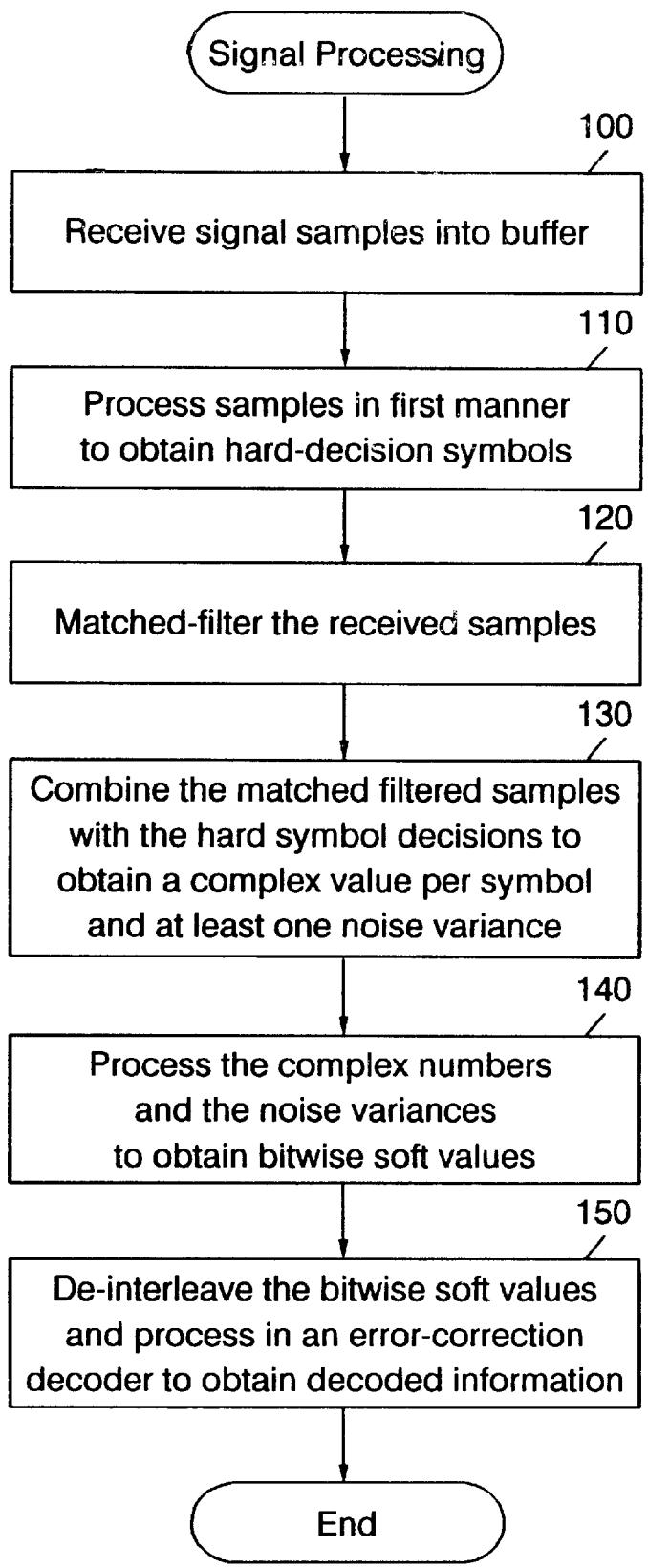
FIG. 3 is a flowchart of signal processing for decoding of symbols according to the present invention.

A flow chart of digital signal processing according to the invention is illustrated in FIG. 3. As was the case in FIG. 2, each block of FIG. 3 and combination of blocks of FIG. 3 may be embodied as hardware, software and/or combinations thereof.

Referring to FIG. 3, at block 100, the receiver receives, filters and digitizes samples which are then stored in buffer memory. At block 110, after each block of samples, such as a TDMA slot or burst, is collected, the samples are processed in a first manner to obtain hard symbol decisions. At block 120, the original data is filtered using a matched filter. Other filters that may be deemed optimum in particular situations may alternatively be used at block 120, but the matched filter, or time-reversed conjugate channel filter, may be the optimum when the noise at the receiver input is white. Also, bearing in mind the above discussion, the filtering at block 120 preferably only applies the remaining amount of filtering over and above receiver IF filtering needed such that the total filtering is a matched filter. Situations where non-matched filtering might be used include those in which the noise or interference does not have a white spectrum. In that case, filtering may deviate from a signal-matched filter by leaning toward suppression of the greatest interfering components. Optimum filtering to apply in the presence of such colored noise is known in the art.

At block 130, the already decided symbols are used together with the matched filtered signal samples to compute a complex number per symbol representative of the "soft" symbol value, plus the mean square value of the noise or error values. When the simplified expressions are used for computing bitwise log-likelihood ratios, a per-block, per-burst or per-slot noise variance may be used to properly scale the soft information for bits from one block relative to bits placed in another block by the transmitter interleaver. This "per-slot" variance is equivalent to the "final metric" used in Hammar's formulation of soft information for binary symbols as disclosed in U.S. Pat. No. 5,099,499 entitled "Method of Generating Quality Factors For Binary Digits Obtained in the Viterbi-Analysis of a Signal", the disclosure of which is hereby incorporated by reference herein.

At block 140, the per-symbol complex numbers are processed with the noise variances to obtain bitwise soft information for each bit of the multibit symbol. Then, a number of blocks of such bitwise soft values are collected at block 150, and when an entire interleaved block has been collected, comprising typically four bursts or slots as processed in blocks 100–140, the soft information is processed in a reordered form, according to an interleaving table, and error-correction decoded using a convolutional decoder or Turbo decoder to obtain hard-decoded information bits. The hard-decoded information bits may also be submitted to a Cyclic Redundancy Check (CRC) to verify correct decoding.

If correct decoding is verified, then the operations have succeeded and may terminate. If correct decoding is not verified, optionally further iterations may be performed by determining whether the bitwise soft information contains sign changes as compared with the hard decisions from block 110. If so, the hard decisions may be modified to accord with the signs of the soft information, and then reprocessed from block 130. Many variations on the above processing are possible depending on the exact nature of the interleaving, i.e., on whether block or block-diagonal interleaving is used, or an optimized form of interleaving as described in the above references. All such variations are considered to lie within the spirit and scope of this invention as described by the following claims.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of decoding multi-bit symbols from a signal that is received on a communications channel, comprising the steps of:

obtaining at least one sample for each symbol from the signal that is received on the communications channel;

processing the at least one sample for each symbol to obtain hard symbol decisions for the symbols;

matched filtering the at least one sample for each symbol to obtain a block of matched filtered samples comprising one sample per symbol;

combining the block of matched filtered samples and the hard symbol decisions to obtain soft symbol values; and processing the soft symbol values to obtain soft bit values for the multi-bit symbols.

2. A method according to claim 1 wherein the at least one sample for each symbol is one sample for each symbol.

3. A method according to claim 1 wherein the step of processing the at least one sample for each symbol comprises the step of performing Viterbi Maximum Likelihood Sequence Estimating (MLSE) for the at least one sample for each symbol to obtain the hard symbol decisions for the symbols.

4. A method according to claim 1 wherein the step of processing the at least one sample for each symbol comprises the step of performing Viterbi Maximum Likelihood Sequence Estimating (MLSE) and Per Survivor Processing (PSP) for the at least one sample for each symbol to obtain the hard symbol decisions for the symbols.

5. A method according to claim 4 wherein the step of processing the at least one sample for each symbol is preceded by the step of prefiltering the at least one sample to condition the at least one sample for MLSE-PSP processing.

6. A method according to claim 5 wherein the step of prefiltering comprises the step of computing prefilter coefficients based upon channel coefficients for the communications channel.

7. A method according to claim 6 wherein the step of prefiltering is preceded by the step of computing the channel coefficients based upon known symbols for the communications channel.

8. A method according to claim 1 wherein the step of obtaining at least one sample comprises the step of filtering the received signal using an intermediate frequency filter, and wherein the step of matched filtering the at least one sample comprises the step of matched filtering the at least one sample for each symbol including the effect of the intermediate frequency filter, to obtain the block of matched filtered samples comprising one sample per symbol.

9. A method according to claim 1 wherein the step of combining comprises the step of passing the hard symbol decisions through a composite filter that represents transmit filtering, a multi-path propagation channel and the step of matched filtering.

10. A method according to claim 9 wherein the composite filter is based on channel estimates that are made using known symbols.

11. A method according to claim 9 wherein the composite filter is based on channel estimates that are made using known symbols and the hard symbol decisions.

12. A method according to claim 1 wherein the combining step comprises the step of combining the block of matched filtered samples and the hard symbol decisions to obtain soft symbol values that compensate for Inter-Symbol Interference (ISI).

13. A method according to claim 1 wherein the step of processing the soft symbol values comprises the step of representing symbols rotated through 22.5 degrees such that possible symbol values lie at odd multiples of 22.5 degrees in a complex plane.

14. A method according to claim 13 wherein a soft value for a first bit is derived only from a real part of the soft symbol values and wherein a soft value for a second bit is derived only from an imaginary part of the soft symbol values.

15. A method according to claim 13 wherein a soft value of a third bit per symbol is derived from a real and an imaginary part of a soft symbol, combined with the hard decisions for a first and a second bit.

16. A method of decoding a signal that is received on a communications channel, comprising the steps of:
    sampling the signal to obtain input signal samples;
    processing the input signal samples to obtain hard symbol decisions;
    filtering the input signal samples to obtain filtered samples;
    combining the filtered samples and the hard symbol decisions to obtain equalized soft symbol values; and
    converting the equalized soft symbol values to obtain soft bit values.

17. A method according to claim 16 wherein the step of processing comprises the step of performing Viterbi Maximum Likelihood Sequence Estimating (MLSE) and Per Survivor Processing (PSP) on the input signal samples to obtain the hard symbol decisions.

18. A method according to claim 17 wherein the step of processing is preceded by the step of prefiltering the input signal samples to condition the input signal samples for MLSE-PFP processing.

19. A method according to claim 16 wherein the filtering step comprises the step of matched filtering the input signal samples to obtain filtered samples.

20. A method according to claim 16 wherein the converting step is followed by the steps of:
    deinterleaving the soft bit values to obtain soft coded bit values; and
    error correction decoding the soft coded bit values to obtain decoded bits.

21. A system for decoding multi-bit symbols from a signal that is received on a communications channel, the system comprising:
    means for obtaining at least one sample for each symbol from the signal that is received on the communications channel;
    means for processing the at least one sample for each symbol to obtain hard symbol decisions for the symbols;
    means for matched filtering the at least one sample for each symbol to obtain a block of matched filtered samples comprising one sample per symbol;
    means for combining the block of matched filtered samples and the hard symbol decisions to obtain soft symbol values; and
    means for processing the soft symbol values to obtain soft bit values for the multi-bit symbols.

22. A system according to claim 21 wherein the at least one sample for each symbol is one sample for each symbol.

23. A system according to claim 21 wherein the means for processing the at least one sample for each symbol comprises means for performing Viterbi Maximum Likelihood Sequence Estimating (MLSE) for the at least one sample for each symbol to obtain the hard symbol decisions for the symbols.

24. A system according to claim 21 wherein the means for processing the at least one sample for each symbol comprises means for performing Viterbi Maximum Likelihood Sequence Estimating (MLSE) and Per Survivor Processing (PSP) for the at least one sample for each symbol to obtain the hard symbol decisions for the symbols.

25. A system according to claim 24 further comprising means for prefiltering the at least one sample to condition the at least one sample for the means for performing MLSE-PSP processing.

26. A system according to claim 21 wherein the means for processing the soft symbol values comprises means for representing symbols rotated through 22.5 degrees such that possible symbol values lie at odd multiples of 22.5 degrees in a complex plane.

27. A system for decoding a signal that is received on a communications channel, the system comprising:
    means for sampling the signal to obtain input signal samples;
    means for processing the input signal samples to obtain hard symbol decisions;
    means for filtering the input signal samples to obtain filtered samples;
    means for combining the filtered samples and the hard symbol decisions to obtain equalized soft symbol values; and
    means for converting the equalized soft symbol values to obtain soft bit values.

28. A system according to claim 27 wherein the means for processing comprises means for performing Viterbi Maximum Likelihood Sequence Estimating (MLSE) and Per Survivor Processing (PSP) on the input signal samples to obtain the hard symbol decisions.

29. A system according to claim 28 further comprising means for prefiltering the input signal samples to condition the input signal samples for the means for performing MLSE-PFP processing.

30. A system according to claim 27 further comprising:
    means for deinterleaving the soft bit values to obtain soft coded bit values; and
    means for error correction decoding the soft coded bit values to obtain decoded bits.

31. A system that decodes multi-bit symbols from a signal that is received on a communications channel, the decoding system comprising:
    a receiver that obtains at least one sample for each symbol from the signal that is received on the communications channel;

an equalizer that is responsive to the at least one sample for each symbol to produce hard symbol decisions for the symbols;

a matched filter that is responsive to the at least one sample for each symbol to produce a block of matched filtered samples comprising one sample per symbol;

a combiner that is responsive to the block of matched filtered samples and the hard symbol decisions to produce soft symbol values; and a converter that is responsive to the soft symbol values to produce soft bit values for the multi-bit symbols.

32. A system according to claim 31 wherein the at least one sample for each symbol is one sample for each symbol.

33. A system according to claim 31 wherein the equalizer comprises a Viterbi Maximum Likelihood Sequence Estimating (MLSE) equalizer.

34. A system according to claim 31 wherein the equalizer comprises a Viterbi Maximum Likelihood Sequence Estimating (MLSE) and Per Survivor Processing (PSP) equalizer.

35. A system according to claim 34 further comprising a prefilter that is responsive to at least one sample to condition the at least one sample for the MLSE-PSP equalizer.

36. A system according to claim 35 further comprising:

a channel estimator that computes channel coefficients from the input signal samples; and a prefilter computer that is responsive to the channel coefficients to compute prefilter coefficients for the prefilter.

37. A system according to claim 31 wherein the converter represents symbols rotated through 22.5 degrees such that possible symbol values lie at odd multiples of 22.5 degrees in a complex plane.

38. A system that decodes a signal that is received on a communications channel, the decoding system comprising:

an A to D converter that samples the signal and converts the samples to digital input signal samples;

an equalizer that is responsive to the digital input signal samples to produce hard symbol decisions;

a filter that is responsive to the digital input signal samples to produce filtered samples;

a combiner that is responsive to the filtered samples and the hard symbol decisions to produce equalized soft symbol values; and a converter that is responsive to equalized soft symbol values to produce soft bit values.

39. A system according to claim 38 wherein the equalizer comprises a Viterbi Maximum Likelihood Sequence Estimating (MLSE) and Per Survivor Processing (PSP) equalizer.

40. A system according to claim 38 wherein the filter comprises a matched filter.

41. A system according to claim 38 further comprising:

a deinterleaver that is responsive to the soft bit values to produce soft coded bit values; and error correction decoder that is responsive to the soft coded bit values to produce decoded bits.

* * * * *